US009434245B2

(12) United States Patent
Mori et al.

(10) Patent No.: US 9,434,245 B2
(45) Date of Patent: Sep. 6, 2016

(54) INDUSTRIAL VEHICLE

(71) Applicants:KABUSHIKI KAISHA KCM, Kako-gun, Hyogo (JP); HITACHI CONSTRUCTION MACHINERY CO., LTD., Tokyo (JP)

(72) Inventors: Yasuo Mori, Takatsuki (JP); Takatomo Ohno, Akashi (JP); Toru Sonobe, Himeji (JP); Hiroyuki Ishida, Kobe (JP); Keisuke Kobayashi, Kakogawa (JP)

(73) Assignees: KABUSHIKI KAISHA KCM, Hyogo (JP); HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/954,666

(22) Filed: Nov. 30, 2015

(65) Prior Publication Data

US 2016/0082831 A1    Mar. 24, 2016

Related U.S. Application Data

(63) Continuation of application No. 14/352,948, filed as application No. PCT/JP2012/006492 on Oct. 10, 2012.

(30) Foreign Application Priority Data

Oct. 18, 2011    (JP) .................................. 2011-228842

(51) Int. Cl.
*B60K 13/02*    (2006.01)
*B60K 13/04*    (2006.01)
(Continued)

(52) U.S. Cl.
CPC ................. *B60K 13/04* (2013.01); *B60K 5/00* (2013.01); *B60K 11/00* (2013.01); *B60K 13/02* (2013.01)

(58) Field of Classification Search
CPC .................... B60K 5/00; B60K 11/00; B60K 13/00–13/06; E02F 9/08; E02F 9/0808
See application file for complete search history.

(56) References Cited

U.S. PATENT DOCUMENTS 4,339,016 A    7/1982    Gerresheim
5,839,397 A *  11/1998   Funabashi .............. B60K 11/04
                                                          123/41.01
(Continued)

FOREIGN PATENT DOCUMENTS

EP    1 582 635 A2    10/2005
JP    H03-42788 U     4/1991
(Continued)

OTHER PUBLICATIONS

Apr. 29, 2015 Supplementary Partial European Search Report issued in European Patent Application No. 12841077.6.
(Continued)

*Primary Examiner* — Jeffrey J Restifo
*Assistant Examiner* — Erez Gurari
(74) *Attorney, Agent, or Firm* — Oliff PLC

(57) ABSTRACT

A wheel loader includes: a driver's cab; an engine; a chassis, at sides of which tires are provided; an engine room in which the engine is mounted on the chassis, the engine room being provided behind the driver's cab; front portion structures respectively standing at left and right positions of a surface of the engine room, the surface being located at the driver's cab side; rear portion structures respectively standing at left and right positions of a surface of the engine room, the surface being opposite to the surface located at the driver's cab side; and a coupling structure that couples upper portions of the front portion structures to upper portions of the rear portion structures and forms a peripheral device installation space at an upper portion of the engine.

8 Claims, 8 Drawing Sheets

(51) Int. Cl.
   *B60K 5/00*   (2006.01)
   *B60K 11/00*  (2006.01)

(56) References Cited

U.S. PATENT DOCUMENTS

| | | | | | |
|---|---|---|---|---|---|
| 6,192,839 | B1* | 2/2001 | Takeshita | ............... | E02F 9/0866 123/41.49 |
| 6,220,207 | B1* | 4/2001 | Kawasaki | ................. | F01P 5/02 123/41.11 |
| 6,401,851 | B1* | 6/2002 | Keen | ...................... | B62D 25/10 180/69.21 |
| 6,427,798 | B1* | 8/2002 | Imashige | ................ | E02F 3/325 123/41.31 |
| 7,124,853 | B1* | 10/2006 | Kole, Jr. | ................ | B62D 21/12 180/312 |
| 7,806,214 | B2* | 10/2010 | Tsukui | ................ | B62D 21/186 180/89.17 |
| 7,967,094 | B2* | 6/2011 | Matsushita | ............ | B62D 25/10 180/69.2 |
| 8,157,042 | B2* | 4/2012 | Fujiki | ................. | A01B 51/026 180/312 |
| 8,191,668 | B2* | 6/2012 | Keane | .................... | B60K 13/04 180/296 |
| 8,365,855 | B2* | 2/2013 | Mamada | ................ | B60K 11/04 180/312 |
| 8,613,338 | B2* | 12/2013 | Rasset | .................. | B62D 25/084 180/311 |
| 2007/0187075 | A1* | 8/2007 | Yamada | ................ | E02F 9/0866 165/135 |
| 2014/0175833 | A1* | 6/2014 | Masuda | ................ | B60R 3/005 296/190.01 |
| 2014/0246262 | A1* | 9/2014 | Mori | ..................... | E02F 9/0808 180/309 |

FOREIGN PATENT DOCUMENTS

| | | |
|---|---|---|
| JP | H05-94065 U | 12/1993 |
| JP | 2000-034742 A | 2/2000 |
| JP | 2002-070077 A | 3/2002 |
| JP | 2005-280683 A | 10/2005 |
| JP | 2010-059749 A | 3/2010 |
| WO | 2009/017752 A1 | 2/2009 |

OTHER PUBLICATIONS

May 4, 2015 Office Action issued in Chinese Patent Application No. 201280048011.6.
Sep. 14, 2015 Office Action issued in European Patent Application No. 12841077.6.
Jan. 29, 2013 International Search Report issued in PCT/JP2012/006492.

* cited by examiner

INDUSTRIAL VEHICLE

This is a Continuation of application Ser. No. 14/352,948 filed on Apr. 18, 2014, which in turn is a U.S. National Phase Application of PCT/JP2012/006492 filed on Oct. 10, 2012, which claims the benefit of JP2011-228842 filed on Oct. 18, 2011. The disclosure of the prior applications is hereby incorporated by reference herein in its entirety.

TECHNICAL FIELD

The present invention relates to an industrial vehicle configured such that a plurality of peripheral devices are arranged in an engine room.

BACKGROUND ART

Conventionally, in industrial vehicles, such as wheel loaders and shovel loaders, an engine room is provided behind a driver's cab, and an engine, peripheral devices, and the like are disposed in the engine room. Examples of the peripheral devices include an air cleaner, an exhaust muffler, a hydraulic accumulator, a coolant sub-tank, and a hydraulic filter. These peripheral devices are provided at, for example, a front portion, upper portion, and rear portion in the engine room in accordance with the arrangement of the engine and the like.

For example, as shown in FIG. 8, in the case of a wheel loader 201 that is one example of the industrial vehicle, tires 202 are respectively provided at a front portion and rear portion of a chassis 203, and a driver's cab 204 is provided at a front-rear direction middle portion between the tires 202. A bucket 206 driven by a boom 205 is provided at the front portion of the chassis 203, and an engine room 207 is provided behind the driver's cab 204. An engine 208 is provided in the engine room 207. An air cleaner 209 and a muffler 210 are provided above the engine 208. A cooling room 212 defined by a dividing wall 211 is provided behind the engine 208, and a radiator 213 and a fan 214 are provided in the cooling room 212.

At the time of periodic inspections and maintenances, a worker needs to, for example, visually confirm and detach the peripheral devices of the engine. For example, in the case of the air cleaner, the worker needs to detach a filter when cleaning. In the case of the coolant sub-tank, the worker needs to visually confirm a coolant level. These inspections of the peripheral devices are performed by opening a cover of the engine room. Here, the workability of the inspections and maintenances of the peripheral devices provided at a small installation place inside the engine room may become low, and such inspections and maintenances may require a lot of time and work.

In a case where there is a deck extending rearward from a side portion of the driver's seat, an opening closed by a side cover provided at a side portion of the engine room may have to be provided at a position away rearward from the deck. In such a case, even in a case where the side cover is opened, the peripheral devices, such as the air cleaner and the hydraulic accumulator, provided in the engine room especially close to the driver's cab need to be inspected by putting a hand into a narrow space between the driver's cab and the engine through a rear side of the tire. Thus, the workability is extremely low, and a lot of time and work are required.

As this type of conventional art, there is a wheel loader in which: the cover of the engine room provided behind the driver's cab is constituted by a side cover configured to open and close in an upper-lower direction and a ceiling cover closing an upper surface of the engine room; and these covers are respectively supported by supporting members (see PTL 1, for example). In the case of this configuration, the inspections are performed by opening the side cover upward, but components, such as a gas spring, are necessary to open and close the side cover.

CITATION LIST

Patent Literature

PTL 1: Japanese Laid-Open Patent Application Publication No. 2010-59749

SUMMARY OF INVENTION

Technical Problem

In recent years, the number of peripheral devices of the engine is increasing due to an exhaust gas regulation and the like. For example, an exhaust gas purifier (Diesel Particulate Filter) may be included.

However, it is difficult to newly secure a space in the engine room in which a plurality of peripheral devices are provided as above. In a case where a new peripheral device is provided in the narrow engine room, it is difficult to perform the maintenance and inspection of this peripheral device with high workability.

In the conventional art described in PTL 1, the cost increases by the gas spring, and the like. In addition, at the time of frequently-performed periodic inspections and maintenances in which it is unnecessary to detach the ceiling cover, the worker needs to work in a state of getting close to the peripheral devices (such as the air cleaner) provided above the engine. However, since an openable angle of the side cover in an upper direction is limited, the side cover becomes an obstacle.

Solution to Problem

Here, an object of the present invention is to provide an engine room structure of an industrial vehicle, the engine room structure being configured such that a plurality of peripheral devices can be provided in an engine room; and the maintenances and inspections of these peripheral devices can be performed with high workability.

To achieve the above object, the present invention is an industrial vehicle including: a driver's cab; an engine; a chassis, at sides of which tires are provided; an engine room in which the engine is mounted on the chassis, the engine room being provided behind the driver's cab; front portion structures respectively standing at left and right positions of a surface of the engine room, the surface being located at the driver's cab side; rear portion structures respectively standing at left and right positions of a surface of the engine room, the surface being opposite to the surface located at the driver's cab side; and a coupling structure that couples upper portions of the front portion structures to upper portions of the rear portion structures and forms a peripheral device installation space above the engine. With this configuration, a plurality of peripheral devices can be provided in a peripheral device installation space formed at an upper portion of the engine room, and the maintenances and inspections of the peripheral devices provided in the peripheral device installation space can be performed through side portions of the engine room with high workability.

Advantageous Effects of Invention

According to the present invention, since a plurality of peripheral devices can be provided in the peripheral device installation space located at the upper portion in the engine room, the maintenances and inspections of the peripheral devices can be performed collectively at the upper portion of the engine room with high workability.

DESCRIPTION OF EMBODIMENTS

Figure 2:
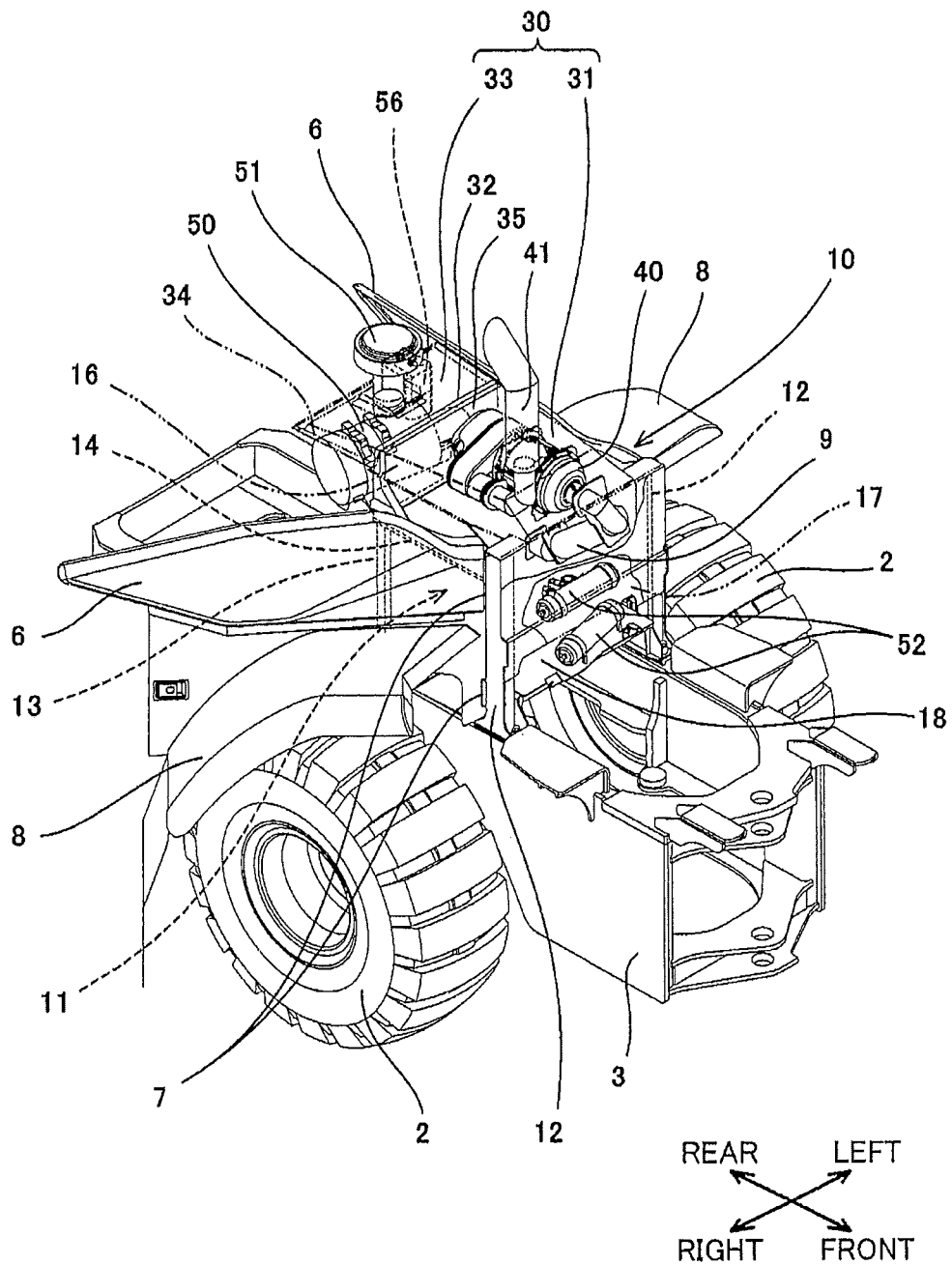
FIG. 2 is a perspective view of the engine room structure of FIG. 1 when viewed from diagonally front.
Figure 8:
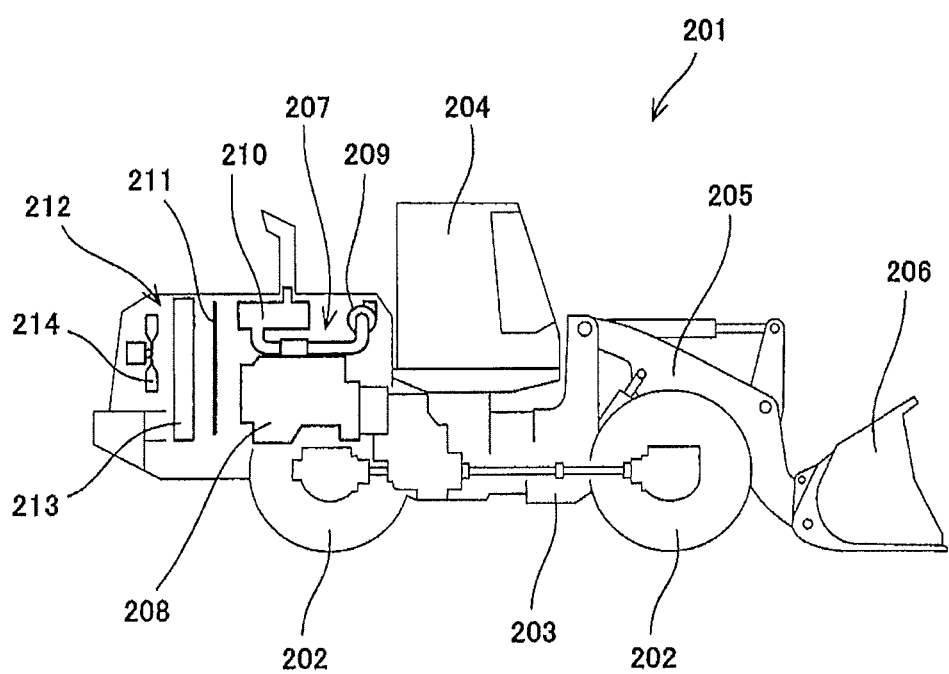
FIG. 8 is a side view schematically showing a conventional wheel loader that is one example of an industrial vehicle.

Hereinafter, embodiments of the present invention will be explained in reference to the drawings. In the following embodiments, a wheel loader will be explained as an example of an industrial vehicle, and components regarding the engine room structure will be explained based on the drawings. A wheel loader 1 is different from the wheel loader 201 shown in FIG. 8 regarding an engine room structure 10 but is the same as the wheel loader 201 shown in FIG. 8 regarding the other components. As shown in FIG. 2, the concept of front, rear, left, and right directions described in the present description and claims corresponds to the concept of front, rear, left, and right directions of the wheel loader 1.

Figure 1:
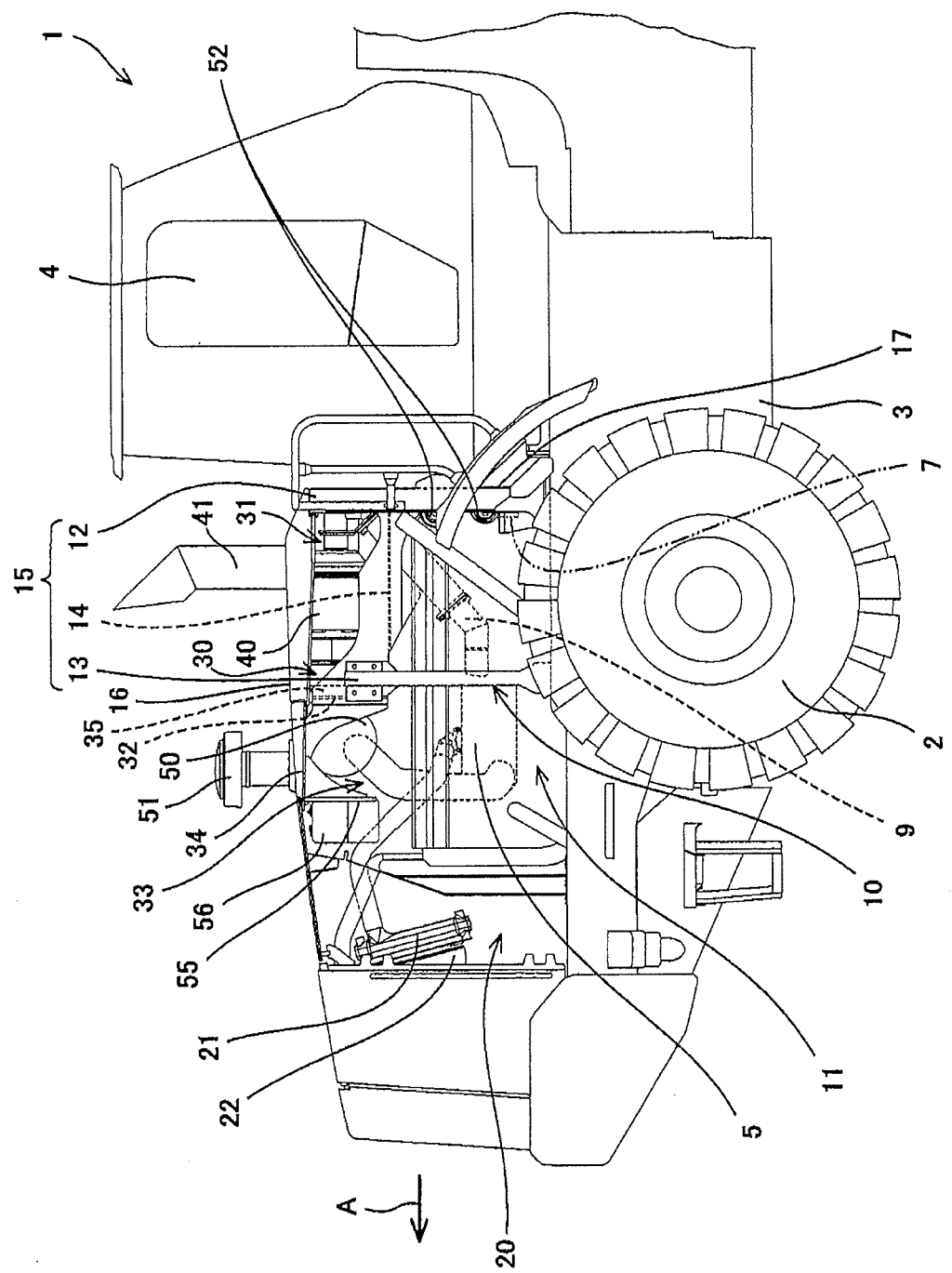
FIG. 1 is a side view showing Embodiment 1 of an engine room structure of an industrial vehicle according to the present invention.

As shown in FIG. 1, in the wheel loader 1 including the engine room structure 10 according to Embodiment 1, a chassis 3 extending in the front-rear direction is provided between left and right tires 2, and a driver's cab 4 and an engine room 11 are provided at an upper portion of the chassis 3. The engine room 11 is provided behind the driver's cab 4. In the present embodiment, the engine room 11 is provided such that a front end portion thereof is located immediately behind the driver's cab 4.

The engine room 11 includes a frame structure 15 formed by front portion structures 12, a coupling structure 14, and rear portion structures 13. The front portion structures 12 are provided at a front portion of the engine room 11, and the rear portion structures 13 are respectively provided behind the front portion structures 12 by a predetermined distance from the front portion structures 12. Upper portions of the front portion structures 12 and upper portions of the rear portion structures 13 are coupled to one another by the coupling structure 14. An upper cover 16 is provided at an upper portion of the engine room 11 and closes the upper portion of the engine room.

The engine room 11 is formed such that a width direction size thereof is equal to a width direction size of the chassis 3, and a front-rear direction size thereof is a size from immediately behind the driver's cab 4 to a rear portion of the rear tire 2. A cooling room 20 in which a radiator 21 and a cooling fan 22 are disposed is provided behind the engine room 11. In the present embodiment, air A flows from the cooling room 20 through the radiator 21 to a rear side. At a lower portion of the engine room 11, an engine 5 is mounted on the chassis 3.

Hinge portions 7 (supporting portions) for opening and closing in a horizontal direction a side cover 6 (FIGS. 2 and 3) closing a side portion of the engine room 11 are provided at each front portion structure 12 provided at a front end position of the engine room 11. In FIG. 1, only the hinge portion 7 is shown by a chain double-dashed line. As above, in the present embodiment, the side portions of the engine room 11 can be widely opened by supporting the side covers 6 by the hinge portions 7 of the front portion structures 12. To be specific, by using as an open-close fulcrum of the side cover 6 the front portion structure 12 provided immediately behind the driver's cab 4, a portion from a position close to the driver's cab 4 to a rear side can be widely opened.

Figure 3:
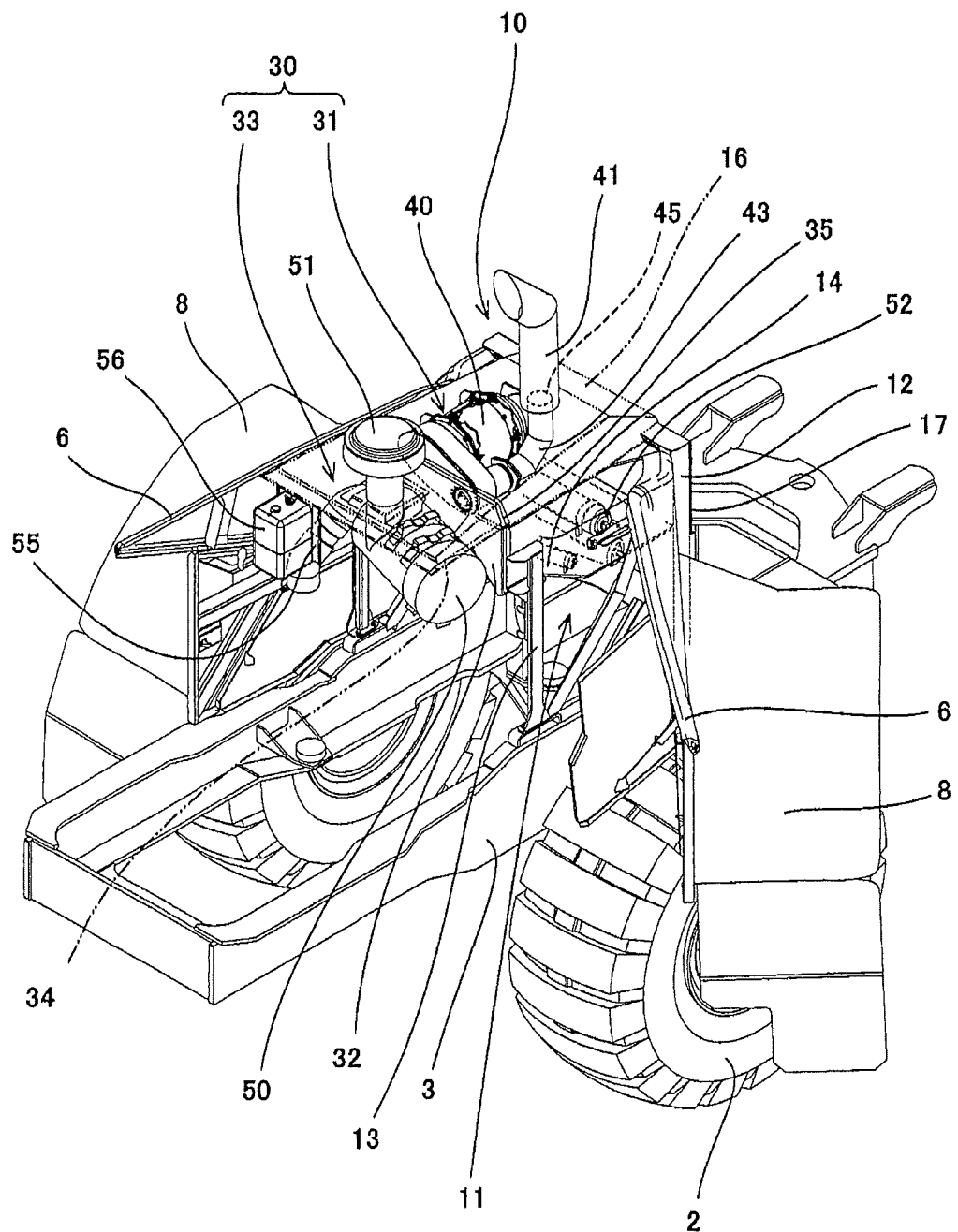
FIG. 3 is a perspective view of the engine room structure of FIG. 1 when viewed from diagonally back.

In the present embodiment, as shown in FIGS. 2 and 3, a rear full fender 8 is provided integrally with each side cover 6 configured to open widely. The inside of the engine room 11 can be inspected by opening the side covers 6 without detaching or moving the rear full fenders 8 in advance.

FIGS. 2 and 3 are diagrams showing a rear portion of the wheel loader 1 from which the driver's cab 4, the engine 5, and the cooling room 20 are omitted. As shown in FIGS. 2 and 3, the front portion structures 12 of the engine room 11 respectively extend upward from left and right positions of a front portion of the engine room 11, and the rear portion structures 13 respectively extend upward from left and right positions of a rear portion of the engine room 11. The front portion structures 12 and the rear portion structures 13 are coupled to one another by the coupling structure 14 to form the frame structure 15. The frame structure 15 is such that the front portion structures 12 and the rear portion structures 13 are respectively located at four corners of the coupling structure 14 formed in a plate shape. In the present embodiment, the front portion structures 12, the rear portion structures 13, and the coupling structure 14 are joined to one another by bolts, nuts, and the like to be formed integrally. FIGS. 2 and 3 show a state where the side cover 6 covering the side portion at a near side of the engine room 11 is open. FIGS. 2 and 3 show the frame structure 15 by seeing through the upper cover 16.

As shown in FIGS. 1 to 3, a dividing plate 32 is provided at a part of the rear portion structures 13, the part being located above the coupling structure 14. A device installation board 34 (located at a rear position of the upper cover 16 of FIG. 1 and shown by a chain double-dashed line in FIGS. 2 and 3) is provided to extend rearward from an upper portion of the dividing plate 32.

A peripheral device installation space 30 is formed by the frame structure 15 so as to be located at an upper portion of the engine in the engine room 11. In the present embodiment, a portion located in front of the rear portion structures 13 is an exhaust system peripheral device installation space 31, and a portion where the device installation board 34 is provided is an intake system peripheral device installation space 33. The exhaust system peripheral device installation space 31 and the intake system peripheral device installation space 33 are divided by the dividing plate 32 provided to extend in a width direction.

A heat insulator 35 is provided at the dividing plate 32 so as to be located at the exhaust system peripheral device installation space 31 side. The heat insulator 35 is provided on an entire surface of the dividing plate 32.

An exhaust gas purifier 40 to which an exhaust pipe 9 of the engine (FIG. 1) is coupled and a muffler 41 configured to discharge the exhaust gas through the exhaust gas purifier 40 to the atmosphere are provided in the exhaust system peripheral device installation space 31. The exhaust gas purifier 40 processes the exhaust gas at a high temperature of, for example, about 600° C. Therefore, the heat insulator 35 prevents the heat of the exhaust system peripheral device installation space 31 from being transferred to the intake system peripheral device installation space 33. The muffler 41 is provided so as to project upward from the upper cover 16.

An air cleaner 50 is provided in the intake system peripheral device installation space 33. The air cleaner 50 is provided so as to be suspended from the device installation board 34. An intake port 51 of the air cleaner 50 is provided so as to project upward from the upper cover 16.

Further, in the present embodiment, a tank fixed member 55 is provided at a rear end portion of the device installation board 34, and a coolant sub-tank 56 is fixed to the tank fixed member 55.

As shown in FIG. 2, the front portion structures 12 provided at the front end position of the engine room 11 are coupled to each other by a plate-shaped front portion coupling member 17. A peripheral device installation shelf 18 is provided at a height direction intermediate portion of the front portion coupling member 17. A hydraulic accumulator 52 is provided at the peripheral device installation shelf 18. Since the frequency of the maintenance and inspection of the hydraulic accumulator 52 is lower than the frequency of the maintenance and inspection of the air cleaner 50 or the like, the hydraulic accumulator 52 is provided at the front portion coupling member 17, not at the peripheral device installation space 30.

Figure 4:
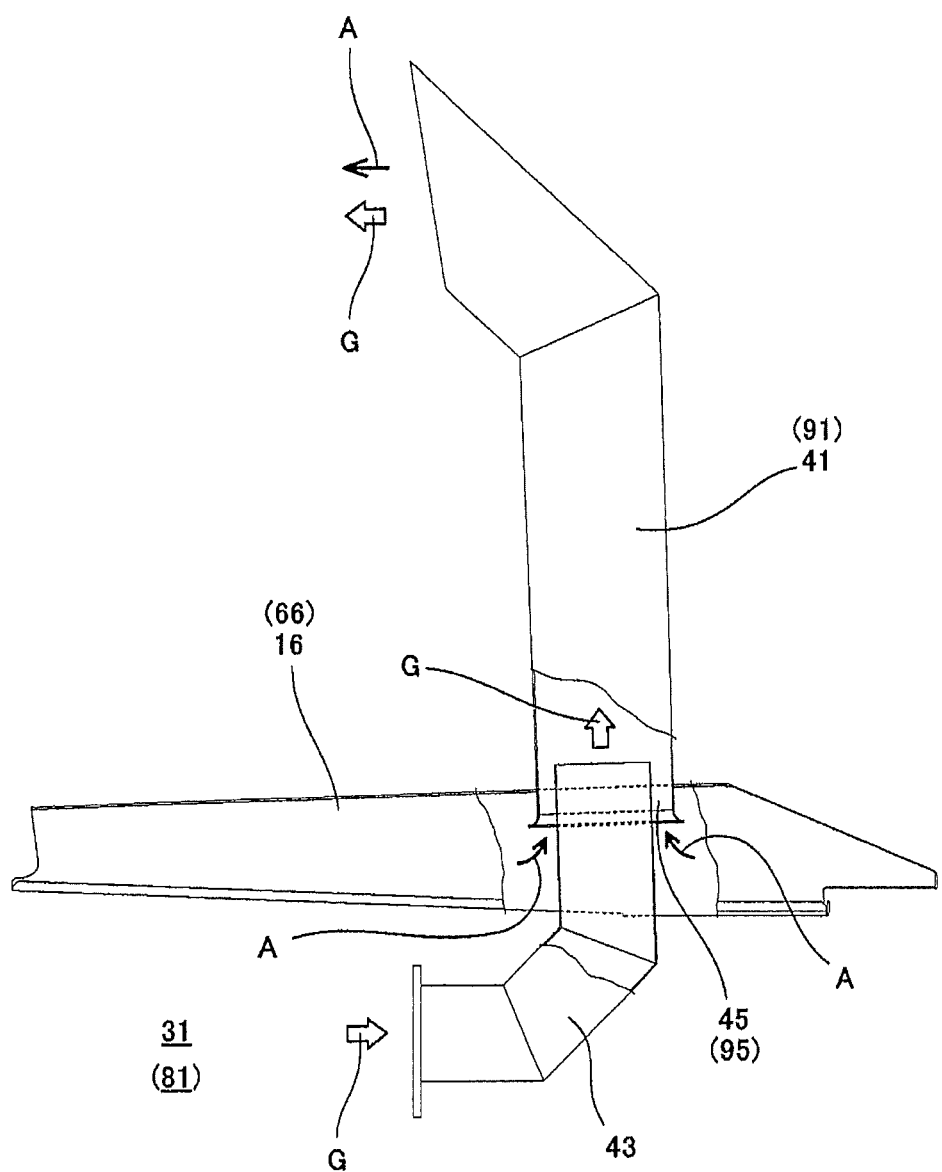
FIG. 4 is a side view showing a muffler portion of the engine room structure shown in FIG. 3.
Figure 5:
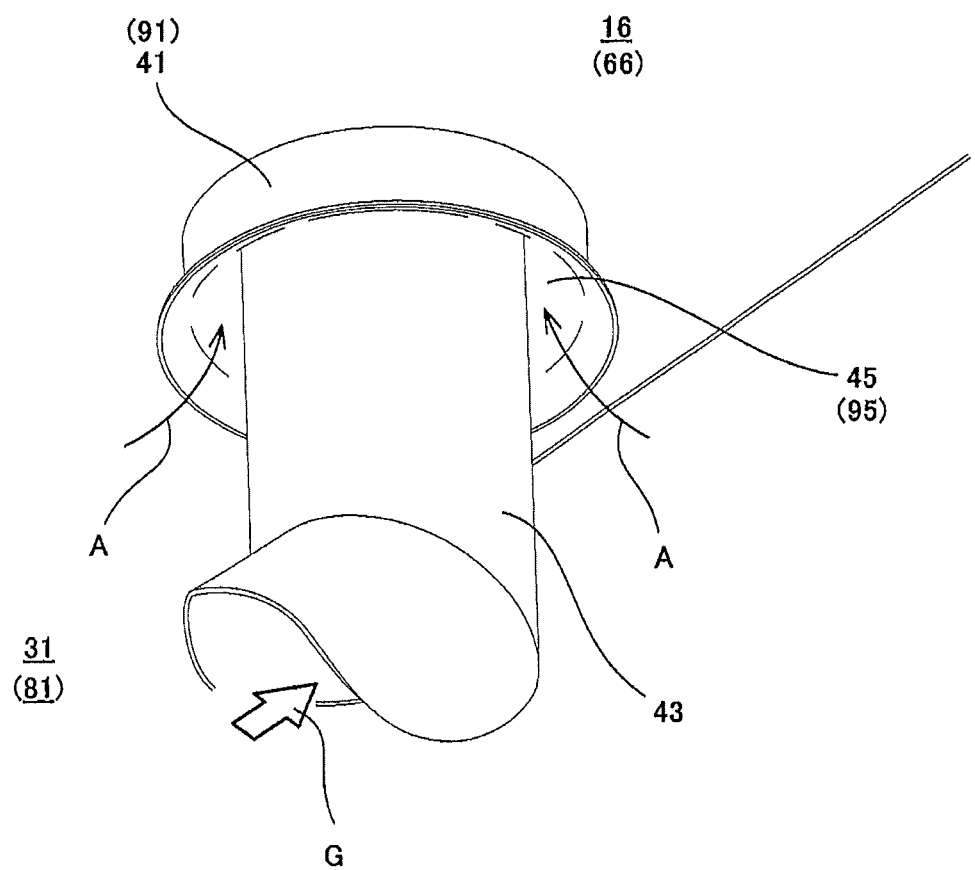
FIG. 5 is an enlarged perspective view of the muffler portion of FIG. 4 when viewed from below.

As shown in FIGS. 4 and 5, the muffler 41 provided at the upper cover 16 of the exhaust system peripheral device installation space 31 is fixed to the upper cover 16. An exhaust pipe 43 extending from the exhaust gas purifier 40 is inserted into the muffler 41.

An opening portion 45 to cause the exhaust system peripheral device installation space 31 to communicate with an exhaust passage of the muffler 41 is provided at a portion, to which the muffler 41 is fixed, of the upper cover 16. The opening portion 45 communicates with the inside of the muffler through a periphery of the exhaust pipe 43 inserted into the muffler 41. By an upward flow generated when an exhaust gas G to be discharged from the exhaust gas purifier 40 to the atmosphere is discharged from the muffler 41, the air A in the exhaust system peripheral device installation space 31 is sucked into the exhaust passage of the muffler 41 to be discharged to the outside. To be specific, the air in the exhaust system peripheral device installation space 31 is actively discharged by utilizing the pressure difference between the exhaust gas G and the air A.

According to the wheel loader 1 (industrial vehicle) including the engine room structure 10, exhaust system elements, such as the exhaust gas purifier 40 and the exhaust pipe 43, can be collectively provided in the exhaust system peripheral device installation space 31 formed at an upper portion of the frame structure 15, and intake system elements, such as the air cleaner 50, can be collectively provided in the intake system peripheral device installation space 33. Therefore, by opening the side covers 6 at the time of the inspections and maintenances, the inspections and maintenances of a plurality of peripheral devices provided at the upper portion of the engine room 11 can be performed with high workability.

Figure 6:
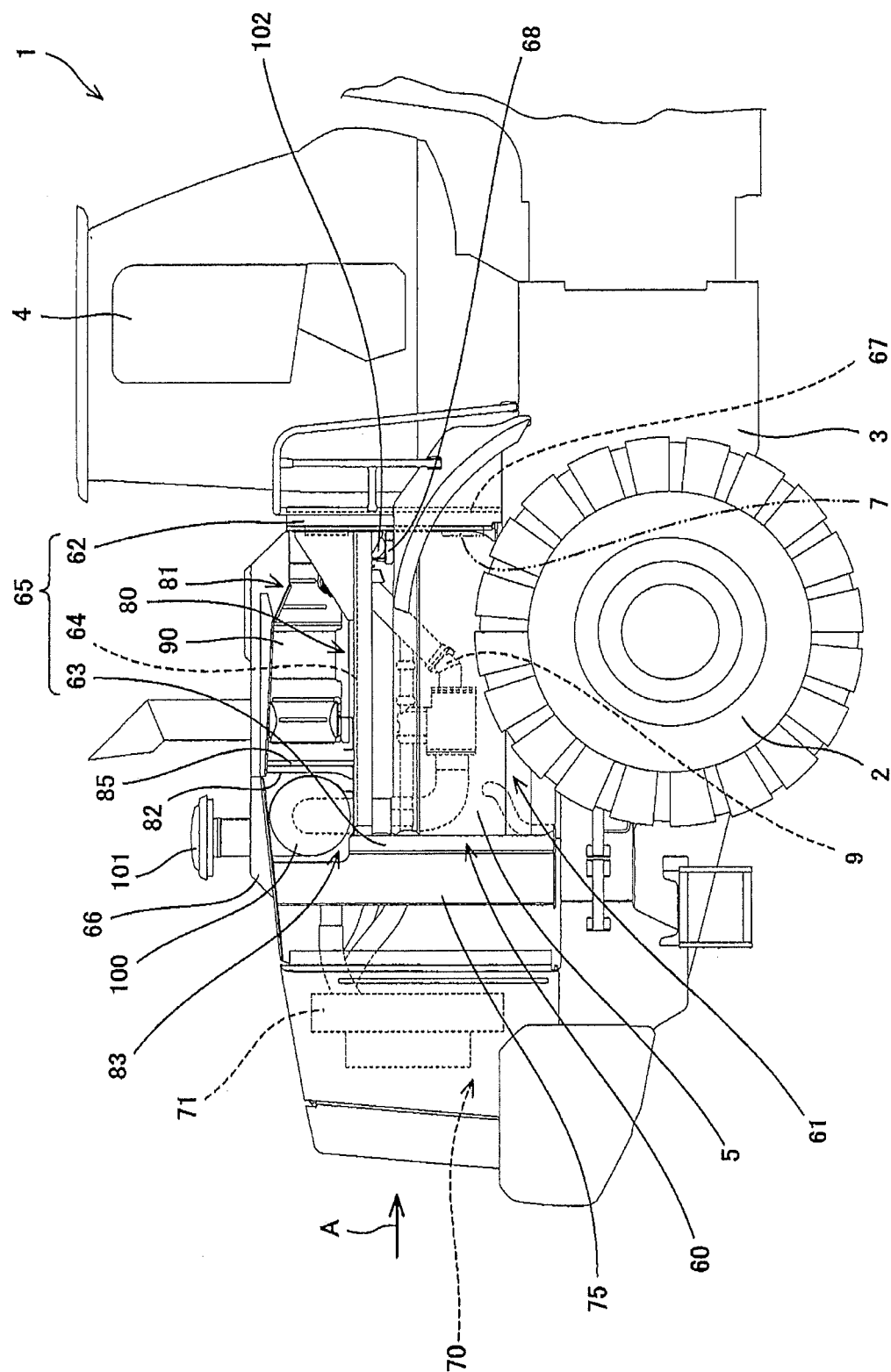
FIG. 6 is a side view showing Embodiment 2 of the engine room structure of the industrial vehicle according to the present invention.
Figure 7:
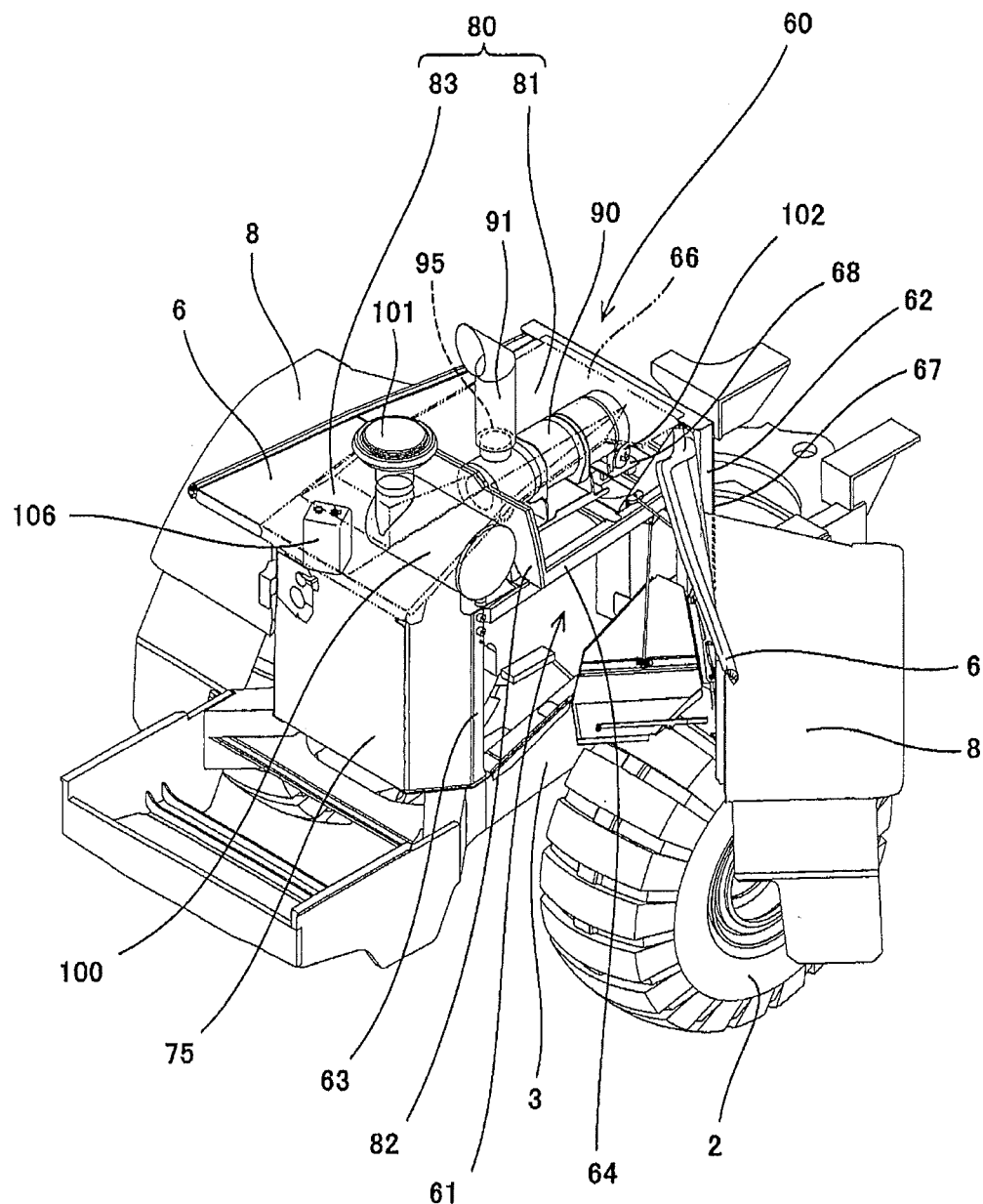
FIG. 7 is a perspective view of the engine room structure of FIG. 6 when viewed from diagonally back.

Next, the wheel loader 1 including an engine room structure 60 according to Embodiment 2 will be explained based on FIGS. 6 and 7. The same reference signs are used for components that are the same as the components explained in Embodiment 1, and detailed explanations thereof are omitted.

The engine room structure 60 of the wheel loader 1 according to Embodiment 2 includes: front portion structures 62 respectively extending upward from left and right positions of a front portion of an engine room 61; and rear portion structures 63 respectively extending upward from left and right positions of a rear portion of the engine room 61, the left and right positions being located behind the front portion structures 62 by a predetermined distance from the front portion structures 62. Upper portions of the front portion structures 62 and upper portions of the rear portion structures 63 are coupled to one another by a coupling structure 64 to form a frame structure 65. Further, an upper cover 66 is provided at an upper portion of the engine room 61 and closes the upper portion of the engine room.

In Embodiment 2, the rear portion structures 63 are provided at positions behind the tires 2, and a dividing wall 75 is provided between the rear portion structures 63 respectively located at the left and right positions. In the present embodiment, the air is caused to flow toward the engine room 61 from a radiator 71 of a cooling room 70 provided behind the engine room 61, and high-temperature air having been subjected to heat exchange in the radiator 71 of the cooling room 70 is caused to flow to sides of the engine room 61 by the dividing wall 75.

In the frame structure 65 of Embodiment 2, a peripheral device installation space 80 is formed above the coupling structure 64 coupling the front portion structures 62 to the rear portion structures 63, and an exhaust system peripheral device installation space 81 and an intake system peripheral device installation space 83 are formed between the front portion structures 62 and the rear portion structures 63. A dividing plate 82 is provided between the exhaust system peripheral device installation space 81 and the intake system peripheral device installation space 83, and a heat insulator 85 is provided at the dividing plate 82.

An exhaust gas purifier 90 is provided in the exhaust system peripheral device installation space 81, and a muffler 91 is provided so as to project upward from the upper cover 66. An air cleaner 100 is provided in the intake system peripheral device installation space 83. The air cleaner 100 is provided at an upper portion of the coupling structure 64, and an intake port 101 is provided so as to project upward from the upper cover 66. In the present embodiment, a coolant sub-tank 106 is provided behind the air cleaner 100.

Further, the front portion structures 62 are coupled to each other by a front portion coupling member 67, and a hydraulic accumulator 102 is provided at a peripheral device installation shelf 68 provided at the front portion coupling member 67.

In Embodiment 2, an opening portion 95 is provided at the upper cover 66 at which the muffler 91 is provided, and the air in the exhaust system peripheral device installation space 81 is actively discharged to the outside by the exhaust gas (the reference signs of the components in Embodiment 2 are attached to the components in Embodiment 1 in FIGS. 4 and 5 described above).

According to the wheel loader 1 (industrial vehicle) including the engine room structure 60, the exhaust system elements, such as the exhaust gas purifier 90, can be collectively provided in the exhaust system peripheral device installation space 81 formed at an upper portion of the frame structure 65, and the intake system elements, such as the air cleaner 100, can be collectively provided in the intake system peripheral device installation space 83. Therefore, by opening the side covers 6 at the time of the inspections and maintenances, the inspections and maintenances of a plurality of peripheral devices provided at the upper portion of the engine room 61 can be performed with high workability.

In the engine room structure 10, 60 of the wheel loader 1 (industrial vehicle) according to Embodiments 1 and 2, the frame structure 15, 65 is formed by integrating the front portion structures 12, 62, the rear portion structures 13, 63, and the coupling structure 14, 64. Therefore, by incorporating a plurality of peripheral devices in the frame structure 15, 65 in advance and fixing the unitized frame structure 15, 65 to the chassis 3, a large number of man-hours can be reduced, and an efficient assembling operation of the industrial vehicle can be performed.

Further, in the engine room structure 10, 60, the hinge portions 7 that serve as the open-close fulcrum of each side cover 6 are provided at each front portion structure 12, 62 so as to be located immediately behind the driver's cab 4. Therefore, the side portions of the engine room 11, 61 can be widely opened, and the maintenances of the peripheral devices, such as the hydraulic accumulator 102, provided between the front portion structures 12, 62 can be performed with high workability.

The above embodiments has explained two types of engine room structures 10 and 60. The present invention is applicable to an engine room structure in which the configurations of the peripheral devices are different from those in the above embodiment, in addition to the existence or non-existence of the dividing wall 75. The present invention is not limited to the above embodiments.

The wheel loader is used as an example of the industrial vehicle. However, the industrial vehicle may be the other vehicle and is not limited to the above embodiments.

Further, each of the above embodiments is just one example. Various modifications may be made within the scope of the present invention, and the present invention is not limited to the above-described embodiments.

The engine room may include side covers covering the side portions of the engine room, respectively, and the front portion structures may be provided immediately behind the driver's cab and include supporting portions for opening and closing the side covers in a horizontal direction. With this configuration, by opening the side cover using as a rotation fulcrum the front portion structure located immediately behind the driver's seat, the side portion of the engine room can be widely opened from immediately behind the driver's cab. Thus, the workability of the maintenances and inspections of the peripheral devices located at a front portion of the engine room can be improved.

The frame structure of the engine room may be formed by integrating the front portion structures, the rear portion structures, and the coupling structure. With this configuration, the front portion structures, the rear portion structures, and the coupling structure constituting the frame structure of the engine room can be integrally fixed to the chassis. By attaching in advance the peripheral devices to the peripheral device installation space formed by the coupling structure, the peripheral devices can be provided in the engine room with high work efficiency.

The front portion structures may be provided with a front portion coupling member coupling the front portion structures standing at the left and right positions, and the front portion coupling member may include a peripheral device installation shelf at which the peripheral devices are provided. With this configuration, the peripheral devices can be provided at the peripheral device installation shelf of the front portion coupling member provided between the front portion structures. Thus, the installation space for the peripheral devices can be secured between the front portion structures.

The coupling structure may include a dividing plate dividing the peripheral device installation space into an exhaust system peripheral device installation space and an intake system peripheral device installation space. With this configuration, the exhaust system and the intake system whose temperatures are different from each other are divided by the dividing plate. Thus, the heat of the exhaust system can be prevented from influencing the intake system.

The dividing plate may include a heat insulator configured to prevent heat of the exhaust system peripheral device installation space from being transferred to the intake system peripheral device installation space. With this configuration, the heat of the exhaust system that becomes high in temperature can be more surely prevented from being transferred to the intake system.

The rear portion structures may be provided with a dividing wall coupling the rear portion structures standing at the left and right positions. With this configuration, even in a case where the air having been subjected to the heat exchange in the radiator of the cooling room provided behind the engine room is caused to flow to the engine room, the rear portion structures can be strongly coupled to each other by the dividing wall configured to prevent the high-temperature air from flowing into the engine room.

The engine room may include an upper cover covering an upper portion of the engine room, the upper cover may include a muffler configured to discharge the exhaust gas, and the muffler may include an opening portion through which the air in the exhaust system peripheral device installation space is discharged to the outside by the upward flow generated by the exhaust gas discharged from the muffler. With this configuration, the air that has been increased in temperature in the exhaust system peripheral device installation space can be discharged through the muffler to the outside by the flow of the exhaust gas, so that the temperature increase around exhaust system peripheral devices that become high in temperature can be prevented.

Each side cover may be formed integrally with a fender for the tire. With this configuration, the inspections and maintenances inside the engine room can be performed by opening the side cover without detaching a full fender for the rear tire in advance or moving the full fender. Therefore, the inspections and maintenances inside the engine room in the industrial vehicle including the rear full fender can be efficiently performed.

INDUSTRIAL APPLICABILITY

The engine room structure according to the present invention can be utilized in industrial vehicles, such as wheel loaders and shovel loaders.

REFERENCE SIGNS LIST

1 wheel loader (industrial vehicle)
2 tire 3 chassis
4 driver's cab
5 engine
6 side cover
7 hinge portion (supporting portion)
10 engine room structure
11 engine room
12 front portion structure
13 rear portion structure
14 coupling structure
15 frame structure
16 upper cover
17 front portion coupling member
18 peripheral device installation shelf
20 cooling room
30 peripheral device installation space
31 exhaust system peripheral device installation space
32 dividing plate
33 intake system peripheral device installation space
34 device installation board
35 heat insulator
40 exhaust gas purifier
41 muffler
43 exhaust pipe
45 opening portion
50 air cleaner
51 intake port
52 hydraulic accumulator
55 tank fixed member
56 coolant sub-tank
60 engine room structure
61 engine room
62 front portion structure
63 rear portion structure
64 coupling structure
65 frame structure
66 upper cover
67 front portion coupling member
68 peripheral device installation shelf
70 cooling room
75 dividing wall
80 peripheral device installation space
81 exhaust system peripheral device installation space
82 dividing plate
83 intake system peripheral device installation space
85 heat insulator
90 exhaust gas purifier
91 muffler
95 opening portion
100 air cleaner
101 intake port
102 hydraulic accumulator
106 coolant reservoir tank
G exhaust gas
A air

The invention claimed is:

1. A wheel loader comprising:
a driver's cab;
an engine;
a chassis, at sides of which tires are provided;
an engine room in which the engine is mounted on the chassis, the engine room being provided behind the driver's cab;
a cooling room in which a radiator and a fan are provided, the cooling room being provided behind the engine room
front portion structures respectively standing at left and right positions of a surface of the engine room, the surface being located at the driver's cab side;
rear portion structures respectively standing at left and right positions of a surface of the engine room, the surface being opposite to the surface located at the driver's cab side; and
a coupling structure on which an exhaust gas purifier is mounted, the coupling structure coupling upper portions of the front portion structures to upper portions of the rear portion structures above the engine, wherein
the exhaust gas purifier is provided between the coupling structure and an upper cover provided at an upper portion of the engine room, an air cleaner is provided behind the exhaust gas purifier, and a divided plate is provided between the exhaust gas purifier and the air cleaner.

2. The wheel loader according to claim 1, wherein:
the engine room includes side covers covering side portions of the engine room, respectively; and
the front portion structures are provided immediately behind the driver's cab and include supporting portions for opening and closing the side covers in a horizontal direction.

3. The wheel loader according to claim 1, wherein the front portion structures, the rear portion structures, and the coupling structure are integrated with one another to form a frame structure of the engine room.

4. The wheel loader according to claim 1, wherein:
the front portion structures are provided with a front portion coupling member coupling the front portion structures standing at the left and right positions; and
the front portion coupling member includes a peripheral device installation shelf on which a hydraulic accumulator is mounted.

5. The wheel loader according to claim 1, wherein the dividing plate includes a heat insulator configured to prevent heat of the exhaust gas purifier from being transferred to the air cleaner.

6. The wheel loader according to claim 1, wherein the rear portion structures are provided with a dividing wall coupling the rear portion structures standing at the left and right positions.

7. The wheel loader according to claim 1, wherein:
the engine room includes an upper cover covering an upper portion of the engine room;
the upper cover includes a muffler configured to discharge an exhaust gas; and
the muffler includes an opening portion through which air around the exhaust gas purifier is discharged to an outside by an upward flow generated by the exhaust gas discharged from the muffler.

8. The wheel loader according to claim 2, wherein each of the side covers is formed integrally with a fender for the tire.

* * * * *